United States Patent Office 2,734,793
Patented Feb. 14, 1956

2,734,793

METHOD OF PREPARING WATER-DISPERSIBLE COMPOSITIONS FOR AZO DYEING

Donald E. Marnon, Glen Rock, N. J., and Joseph Bianco, Troy, N. Y., assignors to General Aniline & Film Corporation, New York, N. Y., a corporation of Delaware No Drawing. Application July 31, 1951,
Serial No. 239,616

2 Claims. (Cl. 8—48)

This invention relates to compositions containing water-insoluble diazotizable aromatic amines in highly dispersed form, yielding dispersions in water and in aqueous compositions which are especially suitable for the production of developed azo colorations on cellulose ester and ether textile materials and superpolyamide fiber (i. e., nylons, such as polyhexamethyleneadipamide).

It has been suggested heretofore to apply water-insoluble or difficultly soluble diazotizable aromatic amines, as well as azo coupling components, in solubilized or dispersed condition, to cellulose ester textile materials for the production of azo colorations which are developed by diazotization and coupling of the amine on the fiber with an azo coupling component. In accordance with U. S. Patents 1,618,413 and 1,618,414 to Ellis, such insoluble azo dye components are solubilized by treatment with concentrated sulforicinoleic acid or its salts, or carbocyclic solubilizing agents such as phenols or aromatic sulfo or carboxy acids, to form compositions which yield, on addition to water, dispersions of the color-forming agent suitable for treatment of cellulose acetate. According to U. S. Patent 2,181,800 to Crossley et al., water-insoluble azo dye pigments can be rendered dispersible in water by kneading a heavy plastic paste containing the pigment together with various protective agents such as dextrin and sodium lignosulfonate with or without the sulfonated diaryl methanes as deflocculating agents, and sufficient water to yield a heavy paste. The water is evaporated from the mixture during the kneading operation or thereafter and the dried mixture reduced to a powder. Use of these materials for coloration of cellulose esters has also been suggested.

Considerable difficulty is encountered, however, in the case of water-insoluble or difficultly soluble diazotizable aromatic amines in preparing aqueous dispersions suitable for the coloration of cellulose ester textile materials and nylon fiber by presolubilization according to the Ellis procedure. It has been found that the aromatic amine bases settle out of dye baths prepared in this manner during the dyeing treatment, and often fail to penetrate the fiber sufficiently to produce, upon development, azo colorations fast to washing and rubbing.

Settling of the bases from dye baths cause non-uniformity in the colorations produced in continuous dyeing, and often results in the formation of spots or streaks on the dyed materials.

Plastic milling of water-insoluble diazotizable amino bases in heavy paste form with most aqueous protective agents in a procedure such as that disclosed in U. S. Patent 2,181,800 to Crossley et al. likewise fails to yield compositions forming aqueous dispersions which remain stable to settling and which afford adequate penetration of the fiber so as to produce developed azo colorations fast to rubbing.

We have discovered that water-insoluble or difficultly soluble diazotizable aromatic amines can be rendered dispersible in water or aqueous coloring compositions such that the dispersion remains stable during dyeing of nylon or cellulose ester textiles, and the amine base is deposited on the fiber in such manner that the azo colorations produced upon diazotization and development with an azo coupling component are uniform and of excellent fastness to rubbing and washing, by subjecting the aromatic amine base to plastic milling in the presence of dispersing agents selected from the class consisting of water-soluble lignosulfonates and secondary licorice extract.

In accordance with this invention, the water-insoluble or difficultly soluble diazotizable aromatic amine is charged, together with the dispersing agent, into a heavy-duty mixer together with sufficient water to yield a heavy viscous paste. The amount of dispersing agent employed is preferably approximately equal to that of the amount of the base to be dispersed. Larger amounts of the dispersing agent can be also used but are generally not required. In general, the amount of dispersing agent employed can be varied from one-half to three times the amount by weight of aromatic amine base to be dispersed.

The mass is then milled for one-half to five hours, a period of one hour ordinarily being sufficient, whereby the particles of insoluble amine are subjected to vigorous shearing action in the mass. This treatment is commonly called "plastic milling." If desired, the water can be evaporated from the mixture to produce a dry composition, and subsequently reduced to a powder. For example, by continuing the mixing during the drying operation, the product is obtained in the form of a powder. However, if the drying step is omitted, the resulting heavy paste can also be used for the preparation of dye baths and printing pastes, in accordance with the invention. If desired, assistants, wetting agents, standardizing diluents and the like can be mixed with the powders or incorporated in the milled pastes of this invention.

The dispersing agents employed in accordance with this invention are, as indicated above, water-soluble lignosulfonates which are obtained from sulfite cellulose waste liquor occurring as a by-product in the sulfite process for preparing wood pulp. The dispersing agents also include secondary licorice extract which is obtained by digesting spent licorice root (from which water-soluble primary licorice extract has been removed by extraction with hot water) with aqueous caustic soda; or alternatively, with alkali metal sulfite or a mixture of alkali sulfide and soda as in the sulfite or sulfate process for producing wood pulp.

Water-soluble lignosulfonates employed for the purposes of this invention are, for example, the sodium, calcium and magnesium salts of lignosulfonic acid and also of partly desulfonated lignosulfonic acid. These materials are sold, for example, under the trade names "Daxad 23" (a sodium lignosulfonate), "Marasperse C" (a calcium lignosulfonate), "Marasperse N" (a sodium lignosulfonate), "Marasperse CB" (a partly desulfonated calcium lignosulfonate), "Darvan 2" (a purified sodium lignosulfonate), and "Maratan A" and "Super Spruce" (magnesium lignosulfonates). A commercial dried secondary licorice extract in the form of a sodium salt is known as "Flotite."

It has been found preferable to employ lignosulfonates which are stable (i. e., remain dissolved and retain their dispersing action) in acid solutions. Of the foregoing, "Maratan A" and "Super Spruce," which are magnesium lignosulfonates, show the best results in view of their acid stability. Such dispersing agents apparently provide optimum results in that they maintain dispersion of the amino base in acid media employed for diazotization and are not affected by acidic components of the fiber undergoing treatment. "Darvan 2," which is a purified sodium lignosulfonate, has been found highly effective despite the fact that its acid stability is not as high as "Maratan A" and "Super Spruce."

The procedure employed in making the dispersible diazotizable aromatic amine compositions of this invention and their use in dyeing cellulose acetate and nylon, are illustrated in the following examples, wherein parts and percentages are by weight unless otherwise indicated.

*Example 1*

A water-insoluble aromatic amine, in the form of the free base of a substantially insoluble salt thereof, and an equal amount of purified sodium lignosulfonate ("Darvan 2"), are charged into a Werner-Pfleiderer mixer with sufficient water to produce a heavy viscous paste. The mixer is operated for one hour, whereby the insoluble diazotizable amine particles are subjected to vigorous shearing action in the mill. The mixture can then be discharged and the product employed in the form of a paste. Alternatively, the mixture can be discharged and dried at 70° C. and the dried mass reduced to a powder e. g. in a hammer mill or micropulverizer. Wetting agents such as condensation products of formaldehyde with naphthalene sulfonic acid are advantageously incorporated in the powder in amounts corresponding, for example, to 1 to 10% of the composition.

Compositions prepared in this manner yield excellent aqueous dispersions of the diazotizable aromatic amine upon addition to water or aqueous dye baths or incorporation in aqueous printing pastes. The dispersions produced are compatible with azo coupling components and yield uniform impregnation of textile materials made of cellulose acetate or nylon when immersed therein or printed therewith. No appreciable settling of the amine occurs in the baths, and azo colorations produced on the aforesaid textile materials are uniform and fast to rubbing and washing.

Diazotizable aromatic amines which have been rendered dispersible in accordance with the procedure of this example are the following:

4,4'-dichloro-2-amino-diphenyl oxide
p-Nitro-o-anisidine
4-methoxy-metanilic acid-n-butylamide
4-amino-2,5-diethoxy-benzanilide
o-Amino-azo toluene
o-Amino-azo toluene hydrochloride
4-(o-methoxyphenyl-azo)-1-naphthylamine Efficacy of the dispersion can be tested by mixing 1 gram of the milled composition with 40 cc. of a 1.25% aqueous solution of N-oleyl-N-methyl taurine sodium salt, diluting with 60 cc. of boiling water, and pouring the resulting dispersion through a piece of 80 x 80 cotton cloth. The residue on the cloth is then washed with 300 cc. of water at 55° to 60° C. Practically no residue is found on the cloth in the case of compositions prepared with "Darvan 2" and the foregoing aromatic amines. Similar results are obtained with "Maratan A" and "Super Spruce." Only minor amounts of residue remain when "Daxad 23," "Marasperse C," "Marasperse CB" or "Flotite" are substituted for "Darvan 2."

*Example 2*

Coloration of cellulose acetate and nylon can be effected with compositions in accordance with this invention, as follows:

0.28 part of a powder, prepared by plastic milling for four hours, a mixture of equal amounts of 2-amino-4,4'-dichlorodiphenyl ether hydrochloride and "Darvan 2" with sufficient water to yield a heavy paste, drying at 60° C. and pulverizing the dried product, are dissolved in 100 parts of water and the resulting solution combined with a solution of an azo coupling component prepared by dissolving 0.1 part of 2,3-hydroxynaphthoic acid p-chloroanilide in 0.5 part of ethylene glycol monomethyl ether together with 0.25 part of 40° Bé. aqueous caustic soda in 50 parts of water. 10 parts of cellulose acetate rayon are dyed in the resulting solution for 45 minutes at 60° C., withdrawn, rinsed with water, and developed by immersing in an aqueous solution containing 5% sodium nitrite and 10% glacial acetic acid for 30 minutes at 60° C. No precipitate of amine base is formed in the impregnating bath, and the material is dyed uniformly in brilliant red shades with no trace of specks.

Similar results are obtained when 10 parts of nylon fiber are similarly dyed.

*Example 3*

Printing of textile materials containing the compositions of this invention is carried out as follows:

3 parts of 3-amino-4-methoxybenzene sulfonic acid-n-butylamide, dispersed by plastic milling with an equal amount of "Darvan 2," as described in Example 1, and dried and pulverized, are dissolved in 16 parts of warm water and added, together with a solution of 5 parts of sodium nitrite in 8 parts of water, to a paste prepared by dissolving 1½ parts of 2,3-hydroxynaphthoic acid-o-anidiside in 1½ parts of 40° Bé. aqueous solution of caustic soda, diluting with 15 parts of water and thickening with 50 parts of textile gum. The resulting paste is printed on cellulose acetate fabric and on nylon material. After drying, the prints are aged for 15 minutes in neutral saturated steam. The material is then exposed for 5 minutes in an acid ager to steam containing acetic or formic acid. Alternatively, the dried and aged material can be immersed for 10 minutes in a solution of 5 parts of sodium nitrite and 5 parts of glacial acetic acid. The prints prepared in this manner are washed, rinsed and dried. A print of deep, bright red shade, which is fast to rubbing and washing, is produced in each case.

*Example 4*

A dispersible powder containing 3.5 parts of 4-benzamido-2,5-diethoxy aniline, prepared as described in Example 2, by plastic milling with an equal amount of "Darvan 2," is dissolved in 14.2 parts of warm water and added, together with a solution of 5 parts of sodium nitrite in 8 parts of water, to a paste prepared by dissolving 1.3 parts of 2,3-hydroxynaphthoic acid anilide in 3 parts of an aqueous 40° Bé. solution of caustic soda, diluting with 15 parts of warm water, and thickening with 50 parts of textile gum. When printed on nylon or acetate rayon fabrics and developed as disclosed in Example 3, prints of deep, brilliant blue shade are formed on all of the samples.

Instead of "Darvan 2" (purified sodium lignosulfonate) employed in the foregoing examples, "Maratan A" or "Super Spruce" (magnesium lignosulfonates) can be employed with equal or better results. The latter dispersing agents have improved stability in acid medium so that somewhat deeper shades are produced than in the case of "Darvan 2," apparently because of the improved stability of the dispersed diazotizable amine on the textile fibers during the acid treatment required for development thereof.

Variations and modifications which will be obvious to those skilled in the art can be made in the compositions and procedures of this invention without departing from the scope or spirit thereof.

We claim:

1. A method of preparing dyeing compositions yielding aqueous dispersions suitable for coloration of cellulose ester, cellulose ether and superpolyamide fibers, which comprises subjecting a heavy aqueous paste containing a substantially water-insoluble diazotizable aromatic amine, and for each part by weight thereof, from ½ to 3 parts of a dispersing agent which is an acid-stable water-soluble magnesium lignosulfonate, to milling so as to subject the particles of said amine to vigorous shearing action in the paste for ½ to 5 hours.

2. A method of preparing a dyeing composition in powdered form yielding aqueous dispersions suitable for coloration of cellulose ester, cellulose ether and superpolyamide fibers which comprises subjecting a heavy aqueous paste containing a substantially water-insoluble diazotizable aromatic amine, and for each part by weight thereof, from ½ to 3 parts of a dispersing agent which is an acid-stable water-soluble magnesium lignosulfonate, to milling so as to subject the particles of said amine to vigorous shearing action in the paste for ½ to 5 hours, drying the resulting paste and pulverizing the solid thus obtained.

References Cited in the file of this patent

UNITED STATES PATENTS

| | | |
|---|---|---|
| 1,236,868 | Puring | Aug. 14, 1917 |
| 1,828,592 | Bommer | Oct. 20, 1931 |
| 1,908,993 | Metzger | May 16, 1933 |
| 1,917,443 | Gassner | July 11, 1933 |
| 2,115,136 | Blackshaw | Apr. 26, 1938 |
| 2,181,800 | Crossley | Nov. 28, 1939 |
| 2,574,597 | Salvin | Nov. 13, 1951 |